Patented May 19, 1931

1,806,471

UNITED STATES PATENT OFFICE

SIMON P. KRAMER, OF CINCINNATI, OHIO

METHOD OF FILTERING AND APPARATUS THEREFOR

No Drawing.   Application filed February 24, 1928.   Serial No. 256,823.

The present invention relates to improvements in filtering, and more particularly bears upon means for accomplishing the filtering of solutions or suspensions of bodies which have heretofore not been regarded as capable of separation from their vehicle by a filtering operation.

Various bodies in suspension or solution in a fluid vehicle are commonly referred to as "filterable" and "nonfilterable", particularly with respect to bacteria, viruses, colloidal solutions, etc. The common assumption seems to be that the particles of the bodies which are smaller than the pores of the filter are filterable, in analogy to the screening of sand or the like. Size, however, cannot be the sole criterion, as demonstrated by the behavior of certain aniline dyes.

Heretofore filtering operations for fluid vehicles containing bodies such as bacteria or viruses have involved the use of a diaphragm comprising some form of silica or silicates such as sand, baked clay, porcelain, diatomaceous earth or asbestos. It will be understood that in speaking of a "diaphragm", reference is made to a sheet or plate of material and also to a layer of granules of such material, illustrated respectively by a porous cup, a sheet of asbestos filtering paper, and a sand filter for use in water purification, by way of examples. It has been found in practice that some bacteria and viruses pass through such siliceous filters, and therefore such bacteria and viruses cannot thereby be removed from the vehicle in which they are contained, such as water, culture media, blood serum, or other fluids. A filter when in action may be regarded as a suspension of the material of which the filter is composed in the fluid or vehicle which is being filtered: and it heretofore has been considered that such siliceous filtering diaphragms are neutral in their behavior with respect to the vehicle and the material dissolved or suspended therein.

It has now been found, however, that whatever may be the behavior of such a diaphragm with respect to a vehicle, e. g., its insolubility therein, the behavior of the diaphragm with respect to the bodies contained in fine division in the vehicle, either by way of solution or suspension, appears to differ according to the relative electrical polarity of the material of the diaphragm with respect to such substance. Since the diaphragms heretofore used have been of siliceous nature, they are of acid reaction, chemically, and may be considered electrolytically as having a negative electric charge. By way of illustration, acid aniline dyes will pass through a siliceous filter immediately, and can be referred to as being "filterable". On the other hand, basic aniline dyes do not pass through such a siliceous filter and can be referred to as being "non-filterable" with such a filter. On the contrary, if a basic filter according to the present invention is employed with such acid and basic aniline dyes, the acid dye will no longer pass through the basic filter, while the basic dyes flow freely through. In each instance, it will be noted that the dyestuff is dissolved within the vehicle, i. e., water: and that the filterability has been, so to speak, reversed by reversing the electric charge of the filter itself with respect to the bodies contained in the vehicle.

It has likewise been found that a similar result occurs with other solutions and suspensions such as vehicles containing bacteria and viruses. Bacteria and viruses, which are "filterable" through a siliceous filter, can be held back by a filter having alkaline quality.

As a specific illustration of this, a basic material, i. e., one having a positive electric charge, and which is comparatively insoluble in water and not destroyed or altered by the heat necessary to harden clay or porcelain, may be employed to prepare a filter which will hold back bacteria and viruses which will pass through an ordinary siliceous filter. One material which has these characteristics and has been found most satisfactory in use is magnesium oxide which has been calcined at or above 1300° C., but it will be understood that others may be used.

Example I

In making a sand filter for filtering water for household use, there is added to a good grade of screened and washed sand, thoroughly dried, from 5 to 50% of finely divided dry magnesium oxide, which has been calcined or dead-burned at 1300° C. The materials are thoroughly mixed while dry, and the mixture is then ready for use in the filter.

On passing a raw water containing sediment and various bacteria through such a filter, it is found that the sand as usual holds back or separates a large quantity of sediment and certain of the bacteria. Further, however, the magnesium oxide acts to hold back and separate other bacteria and sediment which would pass through an ordinary sand filter. In other words, the use of both siliceous matter and basic matter in the same filter provides a structure competent to withhold and depolarize particles and colloidal bodies having respectively positive and negative electric charges, and in the same simple operation.

*Example II*

When a bonded filter, as for example, a filter cup, is to be made from diatomaceous earth or asbestos compound, the dry clay, diatomaceous earth or asbestos material has mixed therewith a proportion of dry magnesium oxide, which has been calcined at 1300° C., in varying amounts up to equal parts by weight with respect to the other materials used. The proportion to be employed may be determined experimentally in accordance with the specific positive electric charge which is necessary to hold back the particles of the given material to be stopped by the filter diaphragm. This dry mixture is then kneaded with water to produce a plastic dough which is then pressed, cast, molded or turned to the desired shape; whereupon the filter body thus produced is dried and kiln-fired at a temperature not exceeding 900° C. A higher temperature than this is to be avoided, since it might bring about a combination of the magnesia and the siliceous compound, whereby a magnesium silicate might be produced which will act similarly to any other siliceous filtering material, i. e., have only a negative electric charge. A filter cup prepared from this material again acts to depolarize bodies in suspension or solution which have both negative and positive electric charges, similarly to the diaphragm described under Example I.

*Example III*

If it be desired to produce a filter diaphragm of material which has only ingredients of basic characteristics, dry finely divided powders may be mixed in the following proportions:

Gypsum _____ 50 to 90%
Magnesium oxide _____ 50 to 10%

It will be understood that the magnesium oxide has been previously calcined at 1300° C. This dry mixture is then added to an equal volume of water, rapidly stirred to expel air bubbles, and then poured into a suitable mold. When this mixture has hardened or set, it is ready for use as a filter.

In practice with such filter diaphragms, it has been found that many micro-organisms and viruses which are filterable through siliceous filters are retained by the present basic or positively charged filters. Such for example are the bacteriophage of *Staphylococcus aureus*, Stuart Mudd's *Vibrio percolans*, and vaccines and rabies viruses, which have passed the Berkefeld siliceous filters.

The theory, under which such filters operate to withhold bodies such as colloidal and other suspensions and solutions including bacteria and viruses which are filterable through the ordinary siliceous Berkefeld filter, is suggested to be the following: Such bodies may be regarded as having negative charge or being "ionized", so that when a liquid vehicle containing such bodies is passed through the acid siliceous diaphragm, the bodes in question pass freely by virtue of the fact of like electric charges, and hence no separation occurs at or in the filter diaphragm. On the contrary, if a diaphragm of basic characteristic be employed, the bodies, being still regarded as of acid behavior, are attracted to the filter particles which have unlike electric charges, and are depolarized in the basic diaphragm which has the positive electric charge, and thereby the body is neutralized and withheld in the diaphragm and no longer passes through in filtration. It will be understood that this theory is suggested as a possibility: and not as being the only means by which such effect may be produced.

It is obvious that the invention is not limited to the specific forms of application and materals set forth, and that the method may be employed in other ways and other types of apparatus utilized within the scope of the appended claims.

I claim:

1. The method of preparing a filtering diaphragm which comprises calcining magnesium oxide at 1300° C., mixing the calcined mass with a silicious material, and kiln firing the mixture at substantially 900° C., whereby to prepare a solid body but without effecting a chemical combination of the magnesium oxide and silicious material.

2. A filtering diaphragm comprising a mixture which has been kiln fired at substantially 900° C. of silicious material and magnesium oxide which has been previously calcined at 1300° C., said diaphragm being a solid body in which the silicious material and magnesium oxide are substantially separate chemical entities.

In testimony whereof, I affix my signature.

SIMON P. KRAMER.